US011768123B2

(12) United States Patent
Hidaka et al.

(10) Patent No.: US 11,768,123 B2
(45) Date of Patent: Sep. 26, 2023

(54) DIAPHRAGM TYPE PRESSURE SENSOR ARRANGEMENT HAVING CORROSION RESISTANCE AND YIELD STRENGTH

(71) Applicant: FUJIKIN INCORPORATED, Osaka (JP)

(72) Inventors: Atsushi Hidaka, Osaka (JP); Takatoshi Nakatani, Osaka (JP); Nobukazu Ikeda, Osaka (JP); Kouji Nishino, Osaka-shi (JP); Ryousuke Dohi, Osaka (JP)

(73) Assignee: FUJIKIN INCORPORATED, Osaka (JP)

( * ) Notice: Subject to any disclaimer, the term of this patent is extended or adjusted under 35 U.S.C. 154(b) by 310 days.

(21) Appl. No.: 17/282,016

(22) PCT Filed: Oct. 2, 2019

(86) PCT No.: PCT/JP2019/039017
§ 371 (c)(1),
(2) Date: Apr. 1, 2021

(87) PCT Pub. No.: WO2020/075600
PCT Pub. Date: Apr. 16, 2020

(65) Prior Publication Data
US 2021/0356346 A1 Nov. 18, 2021

(30) Foreign Application Priority Data
Oct. 9, 2018 (JP) .................. 2018-190708

(51) Int. Cl.
G01L 19/14 (2006.01)
G01L 9/00 (2006.01)

(52) U.S. Cl.
CPC ............ *G01L 19/14* (2013.01); *G01L 9/0041* (2013.01)

(58) Field of Classification Search
None
See application file for complete search history.

(56) References Cited

U.S. PATENT DOCUMENTS 7,150,198 B2   12/2006   Kaneko et al.
7,363,819 B2*   4/2008   Mast .................. G01L 19/0038
                                                    73/756

FOREIGN PATENT DOCUMENTS

JP   H0569647 A   3/1993
JP   H1082707 A   3/1998
(Continued)

OTHER PUBLICATIONS

International Search Report issued in PCT/JP2019/039017; dated Oct. 29, 2019.

*Primary Examiner* — Andre J Allen
*Assistant Examiner* — Jermaine L Jenkins
(74) *Attorney, Agent, or Firm* — Studebaker & Brackett PC

(57) ABSTRACT

A pressure sensor includes a cylindrical member configured to be attached to a body having a fluid passage, and a pressure sensor unit connected to the cylindrical member for detecting a pressure of a fluid flowing through the fluid passage, wherein the cylindrical member is made of a nickel-molybdenum-chromium alloy material or a stainless steel material, wherein the pressure sensor unit includes a sensor body closed at one end with a diaphragm and a pressure detecting element for outputting displacement of the diaphragm as pressure, and wherein the sensor body is made of a cobalt-nickel alloy material, and is connected at an opening side end portion to one end portion of the cylindrical member.

8 Claims, 4 Drawing Sheets

(56) References Cited

FOREIGN PATENT DOCUMENTS

| | | | |
|---|---|---|---|
| JP | 2005148002 | A | 6/2005 |
| JP | 2007033075 | A | 2/2007 |
| JP | 4185477 | B2 | 11/2008 |
| JP | 2018048859 | A | 3/2018 |

\* cited by examiner

Prior Art

DIAPHRAGM TYPE PRESSURE SENSOR ARRANGEMENT HAVING CORROSION RESISTANCE AND YIELD STRENGTH

TECHNICAL FIELD

The present invention relates to a diaphragm type pressure sensor using a pressure detecting element (strain gauge or pressure sensitive element) which is mainly provided in a fluid supply line such as a gas of a semiconductor manufacturing equipment or a chemical plant, or in a pressure type flow rate control device or a concentration measurement device or the like incorporated in the fluid supply line, and detects the pressure of a fluid such as a gas flowing through the fluid supply line.

BACKGROUND ART

Conventionally, various types of pressure sensors are used for pressure detection of fluid flowing through the fluid supply line of the semiconductor manufacturing equipment, or the like.

For example, as the pressure sensor, a pressure sensor for detecting the pressure of the fluid by attaching a strain gauge to a diaphragm, an absolute pressure type pressure sensor having a space adjacent to the diaphragm as a vacuum chamber, a pressure sensor enclosing a pressure transmission medium such as silicone oil in a space adjacent to the diaphragm, a pressure sensor with a diaphragm and a body made of a stainless steel material having excellent corrosion resistance, and the like, are known (see Patent Documents 1 to 3).

Incidentally, as in the case where the gas supply line of the semiconductor manufacturing equipment flows a corrosive gas such as a halogen gas, for example, hydrogen chloride or hydrogen bromide, or a fluorine-containing gas, for example, fluorine gas or hydrogen fluoride, a pressure sensor uses a diaphragm (pressure sensing portion) and other parts in contact with the corrosive gas which are made of austenitic stainless steel having excellent corrosion resistance.

However, in the pressure sensor having the diaphragm as the pressure sensing portion made of austenitic stainless steel, even though the diaphragm has excellent corrosion resistance, but it has low tensile strength and yield strength. For this reason, when using the pressure sensor for a long time or a long term, or when increasing the sensitivity by taking a large distortion of the diaphragm as the pressure sensing portion, the yield strength of the diaphragm deteriorates.

Therefore, in the pressure sensor, long-time or long-term use of the austenitic stainless steel diaphragm as the pressure sensing portion will cause problems such as strain increase due to deterioration of the yield strength, deviation of the zero point, or the like, and a problem of not being able to measure the pressure with high accuracy occurs. However, the problem does not occur if the austenitic stainless steel is used as the material of the body of the pressure sensor that does not contact the corrosive gas.

In order to solve the above problems, the diaphragm (pressure sensing portion) may be made of a material having excellent corrosion resistance and yield strength.

For example, in Japanese Patent Laying-Open Publication No. 2005-148002 (Patent Document 4) and Japanese Patent Laying-Open Publication No. 2018-048859 (Patent Document 5), pressure sensors whose diaphragms (pressure sensing portion) are made of a metal material having excellent corrosion resistance and yield strength are described.

That is to say, the conventional pressure sensor 30, as shown in FIG. 5, includes a pressure sensing portion 31 formed of a diaphragm 31a in contact with the fluid, a strain gauge 32 provided on the diaphragm 31a and a supporting part 34 for supporting the outer circumferential portion of the pressure sensing portion 31, and forming a reference pressure chamber 33 with the diaphragm 31a of the pressure sensing portion 31, wherein the pressure sensing portion 31 formed of the diaphragm 31a is made of a cobalt-nickel alloy material (Spron™) having excellent corrosion resistance and yield strength.

In the pressure sensor 30, since the pressure sensing portion 31 formed of the diaphragm 31a is made of the cobalt-nickel alloy material with excellent corrosion resistance and yield strength, the problem such as strain hardly occurs even by long-time or long-term use, so that it is possible to measure the pressure with high accuracy.

However, since the cobalt-nickel alloy material forming the pressure sensing portion 31 of the pressure sensor 30 deforms by pressure, even though it is suitable for use as a diaphragm 31a, it is not a suitable material for use in a structure to perform sealing or the like. It is because of that, the hardness of the cobalt-nickel alloy material is considerably higher than that of the austenitic stainless steel, when tightened and fixed to the body having the fluid passage, loosening is likely to occur, and the sealing property is impaired.

Therefore, in the pressure sensor 30, when tightening and fixing the pressure sensing portion 31 side made of cobalt-nickel alloy material to the body having the fluid passage, loosening is likely to occur, and the problem of the sealing property being impaired occurs.

PRIOR-ART DOCUMENT

Patent Documents

[Patent literature 1] Japanese Laid-Open Utility Model Publication No. H05-069647
[Patent literature 2] Japanese Laid-Open Patent Publication No. H10-082707
[Patent literature 3] Japanese Laid-Open Patent Publication No. 2007-033075
[Patent literature 4] Japanese Laid-Open Patent Publication No. 2005-148002
[Patent literature 5] Japanese Laid-Open Patent Publication No. 2018-048859

SUMMARY OF INVENTION

Technical Problem

The present invention has been made in view of such problems, and the object is to provide a pressure sensor having excellent sealing property, and capable of measuring pressure with high accuracy, by forming the sensor body having a diaphragm with a metal material having excellent corrosion resistance, yield strength and elasticity, as well as forming the cylindrical member for attaching the sensor body to the body having the fluid passage with a metal material suitable for the sealing structure and excellent in corrosion resistance.

Solution to Problem

To achieve the above object, the pressure sensor according to an embodiment of the present invention includes a cylindrical member configured to be attached in an airtight manner to a body having a fluid passage in a state of communicating with the fluid passage, and a pressure sensor unit connected to the cylindrical member for detecting a pressure of a fluid flowing through the fluid passage of the body, wherein the cylindrical member is made of a nickel-molybdenum-chromium alloy material or a stainless steel material, wherein the pressure sensor unit includes a sensor body provided with a pressure receiving chamber into which the fluid flows and a diaphragm in contact with the fluid flowing into the pressure receiving chamber, and closed at one end with the diaphragm, and a pressure detecting element for outputting displacement of the diaphragm as pressure, and wherein the sensor body is made of a cobalt-nickel alloy material, and connected at an opening side end portion to one end portion of the cylindrical member in an airtight manner.

In one embodiment, the cylindrical member and the sensor body are connected by welding in an airtight manner.

In one embodiment, the cylindrical member is configured to have a smaller diameter than the maximum outer diameter of the pressure sensor unit, a welding flange portion provided at one end of the cylindrical member, and a mounting flange portion provided at the other end of the cylindrical member, wherein the sensor body of the pressure sensor unit includes a connecting cylindrical portion protruded at the end face of the opening side end portion of the sensor body and configured to have a smaller diameter than the maximum outer diameter of the pressure sensor unit and an inner diameter as same as an inner diameter of the cylindrical member, and a welding flange portion provided at the opening side end portion of the connecting cylindrical portion for abutting the welding flange portion of the cylindrical member, and wherein the welding flange portion of the cylindrical member and the welding flange portion of the connecting cylindrical portion formed on the sensor body are connected and fixed in an airtight manner by welding.

In one embodiment, the cylindrical member and the sensor body are connected in an airtight manner by a flange connection.

In one embodiment, the cylindrical member is configured to have a smaller diameter than the maximum outer diameter of the pressure sensor unit, a connecting flange portion provided at one end of the cylindrical member, and a mounting flange portion provided at the other end of the cylindrical member, wherein the sensor body of the pressure sensor unit includes a connecting cylindrical portion protruded at the end surface of the opening side end portion of the sensor body and configured to have a smaller diameter than the maximum outer diameter of the pressure sensor unit and an inner diameter as same as an inner diameter of the cylindrical member, and a connecting flange portion is provided at the opening side end portion of the connecting cylindrical portion for abutting the connecting flange portion of the cylindrical member, and wherein a gasket is sandwiched between the connecting flange portion of the cylindrical member and the connecting flange portion of the connecting cylindrical portion formed in the sensor body, and the connecting flange portion of the cylindrical member and the connecting flange portion of the connecting cylindrical portion are connected and fixed in an airtight manner by tightened with bolts and nuts.

In one embodiment, the cylindrical member is configured to have a smaller diameter than the maximum external diameter of the pressure sensor unit, a connecting flange portion provided at one end portion of the cylindrical member, and a mounting flange portion provided at the other end of the cylindrical member, wherein the sensor body of the pressure sensor unit includes a connecting cylindrical portion protruded at the end surface of the opening side end portion of the sensor body of the pressure sensor unit and configured to have a smaller diameter than the maximum external diameter of the pressure sensor unit and an inner diameter as same as an inner diameter of the cylindrical member, and a connecting flange portion provided at the opening side end portion of the connecting cylindrical portion for abutting the connecting flange portion of the cylindrical member, and wherein a gasket is sandwiched between the connecting flange portion of the cylindrical member and the connecting flange portion of the connecting cylindrical portion formed in the sensor body, and the connecting flange portion of the cylindrical member and the connecting flange portion of the connecting cylindrical portion are connected and fixed in an airtight manner by clamping from outside by a clamp.

Effect of Invention

Using the pressure sensor according to the embodiment of the present invention, since the sensor body having the diaphragm in the pressure sensor unit is made of the cobalt-nickel alloy material having excellent corrosion resistance, yield strength, and elasticity, strain or the like is hardly generated in the sensor body even through long-term use, and it is possible to measure the pressure with high accuracy.

Further, in the pressure sensor according to the embodiment of the present invention, since the cylindrical member attached to the body having the fluid passage is made of the nickel-molybdenum-chromium alloy material or the stainless steel material having excellent corrosion resistance, and lower hardness than that of the sensor body, even if the cylindrical member is tightened and fixed to the body side, loosening or the like hardly occurs, and the sealing property is not impaired.

In addition, in the pressure sensor according to the embodiment of the present invention, the connecting cylindrical portion is protruded on the end surface of the opening side end portion of the sensor body having a diaphragm, and the cylindrical member airtightly attached to the body having the fluid passage is airtightly connected to the opening side end portion of the connecting cylindrical portion, thereby the distance between the opening side end portion of the cylindrical member and the diaphragm of the sensor body is made longer. Therefore, even if the mounting flange portion provided on the opening side end portion of the cylindrical member is airtightly tightened and fixed to the body having the fluid passage by a bonnet nut, the stress applied to the mounting flange portion is absorbed by the cylindrical member and the connecting cylindrical portion, and thus is not transmitted to the diaphragm, so it is possible to eliminate the influence of stress on the diaphragm and fluctuation in the output characteristics before and after mounting the pressure sensor to the body. As a result, no aging (running test) is required.

Moreover, in the pressure sensor according to the embodiment of the present invention, since the cylindrical member attached to the body having the fluid passage is configured to have a smaller diameter than the maximum outer diameter of the pressure sensor unit, the space for attaching the pressure sensor to the body may be small, thereby miniaturization of the body and reduction of the internal volume of the fluid passage may be obtained.

Furthermore, in the pressure sensor according to the embodiment of the present invention, since a welding flange portion is provided to the cylindrical member and the connecting cylindrical portion of the sensor body respectively, so as to fix both welding flange portions by welding, the thickness of the weld portion may be made thicker, and weld cracking may be prevented, also the penetration depth of the weld may be deepened, and the airtightness may be increased.

DESCRIPTION OF EMBODIMENTS

Hereinafter, embodiments of the present invention will be described in detail with reference to the drawings.

Figure 1:
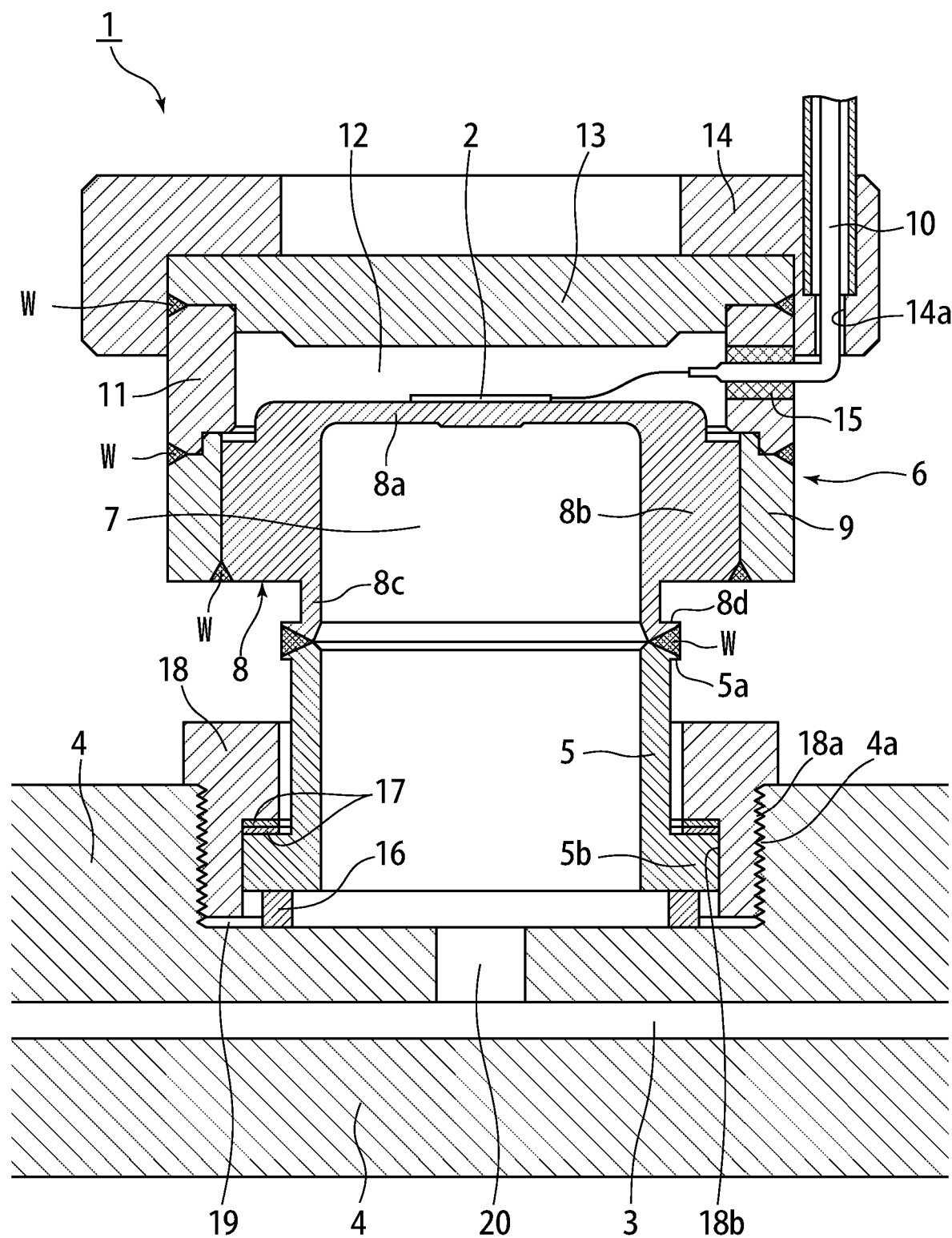
FIG. 1 is a longitudinal sectional view of a state where a pressure sensor according to an embodiment of the present invention is attached to the body having the fluid passage.
Figure 2:
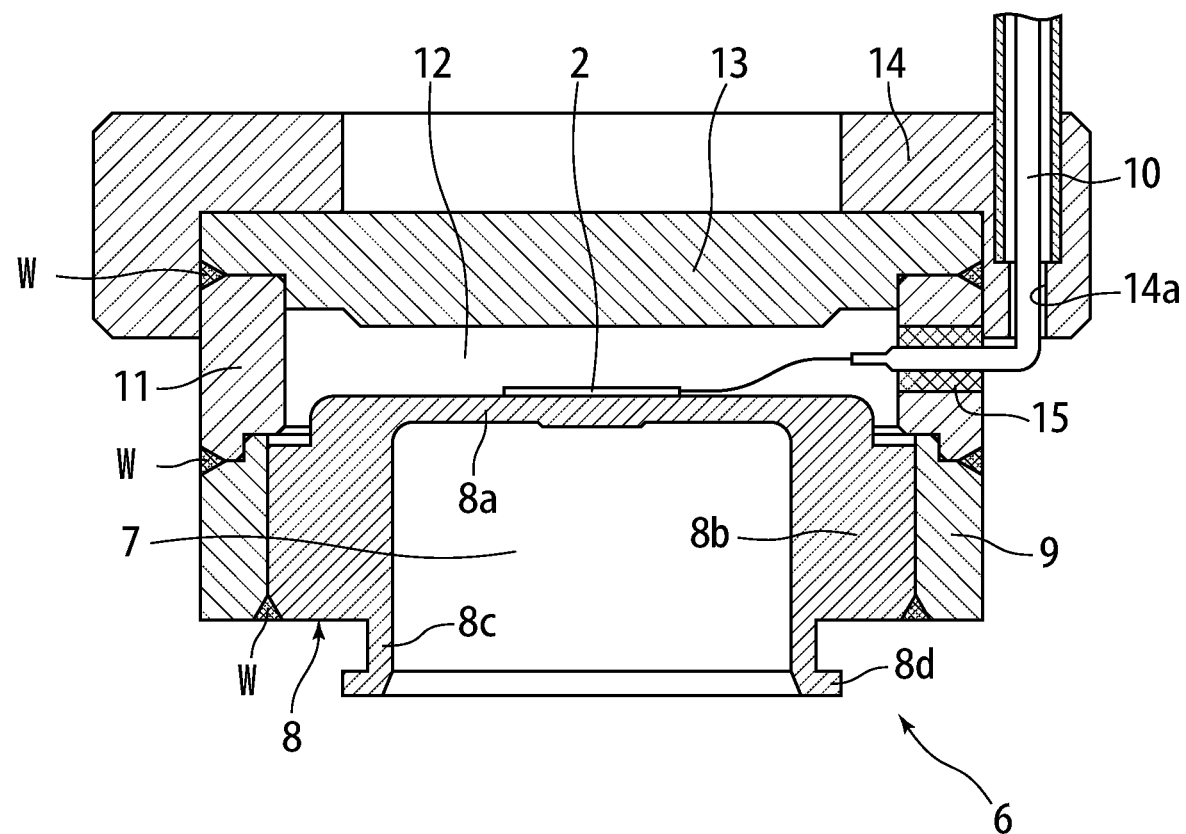
FIG. 2 is a longitudinal sectional view of the pressure sensor unit of the pressure sensor.
Figure 3:
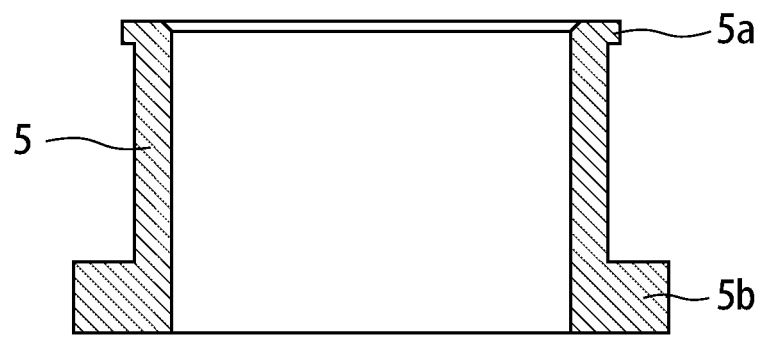
FIG. 3 is a longitudinal sectional view of the cylindrical member of the pressure sensor.

FIGS. 1 to 3 show a pressure sensor 1 according to an embodiment of the present invention. The pressure sensor 1 is an absolute pressure type diaphragm pressure sensor using a pressure detecting element 2 (strain gauge or pressure sensing element) and is mainly provided in a pressure type flow rate control device, a concentration measurement device, or the like, incorporated in a fluid supply line of gas in a semiconductor manufacturing equipment, for detecting a pressure of the gas flowing through the fluid supply line.

The pressure sensor 1 includes a cylindrical member 5 attached in a state of communicating with a fluid passage 3 to a body 4 having the fluid passage 3 in an airtight manner, and a pressure sensor unit 6 connected to the cylindrical member 5 in an airtight manner for detecting the pressure of the fluid flowing in the fluid passage 3 of the body 4.

The cylindrical member 5, as shown in FIGS. 1 and 3, is configured to have a cylindrical shape with a smaller diameter than the maximum outer diameter of the pressure sensor unit 6, and made of a metal material having excellent corrosion resistance that is suitable for the seal structure, a welding flange portion 5a connected and fixed to the pressure sensor portion 6 by welding (e.g., electron beam welding or laser welding) is integrally provided at one end portion of the cylindrical member 5, and a mounting flange portion 5b attached to the body 4 is integrated at the other end portion of the cylindrical member 5.

In the present embodiment, the cylindrical member 5 is made of a Hastelloy C-22 (Hastelloy is a registered trademark), which is one of the nickel-molybdenum-chromium alloy materials having excellent corrosion resistance, and the like, or a SUS316L, which is one of the excellent austenitic stainless steel having excellent corrosion resistance, or the like. Further, the inner peripheral surface of the cylindrical member 5 is subjected to an electrolytic polishing process.

The hardness (Hv) of the Hastelloy C-22 is ≤260, and the hardness (Hv) of the SUS316L is ≤200.

As shown in FIGS. 1 and 2, the pressure sensor unit 6 includes a cylindrical sensor body 8 provided with a pressure receiving chamber 7 into which a fluid flows and a diaphragm 8a that contacts with the fluid flowing into the pressure receiving chamber 7 and displaces in accordance with the pressure of the fluid, and closed at one end with the diaphragm 8a, a pressure detecting element 2 provided on the outer surface of the diaphragm 8a for outputting the displacement of the diaphragm 8a as a pressure, a base ring 9 fitted and fixed to the outer peripheral surface of the sensor body 8 in an air-airtight manner, a hermetic ring 11 having one end surface connected to one end surface of the base ring 9 in an air-airtight manner, surrounding the peripheral outer surface of the diaphragm 8a, and having a plurality of lead wires 10 inserted in an air-tight manner, a closing disk 13 connected to the other end surface of the hermetic ring 11 in an air-tight manner and configured to have an vacuum chamber 12 with the diaphragm 8a, and a cover body 14 for holding the plurality of lead wires 10 passing through the hermetic ring 11 in a right angle state.

More specifically, as shown in FIGS. 1 and 2, the cylindrical sensor body 8 is configured to have a cylindrical shape with one end closed, made of a metal material having excellent corrosion resistance, yield strength, and elasticity, and provided with a cylindrical portion 8b that is thicker than the cylindrical member 5, having an outer diameter larger than the maximum outer diameter (outer diameter of the mounting flange portion 5b) of the cylindrical member 5 and an inner diameter as same as that of the cylindrical member 5, a diaphragm 8a integrally provided at one end of the cylindrical portion 8b for closing the opening at one end side of the cylindrical portion 8b, and a connecting cylindrical portion 8c integrally provided at the end surface of the opening side end portion of the cylindrical portion 8b and connected to the cylindrical member 5 in an airtight manner.

In addition, the connecting cylindrical portion 8c of the sensor body 8 is protruded outwardly on the end surface of the opening side end portion of the cylindrical portion 8b, with an outer diameter smaller than the maximum outer diameter of the cylindrical sensor body 8 (the outer diameter of the cylindrical portion 8b) and an inner diameter as same as the inner diameter of the cylindrical member 5.

Furthermore, at the opening side end portion of the connecting cylindrical portion 8c of the sensor body 8, a welding flange portion 8d abutting the welding flange portion 5a of the cylindrical member 5 is integrally provided, wherein the welding flange portion 5a of the cylindrical member 5 and the welding flange portion 8d of the cylindrical sensor body 8 are able to be connected and fixed in an airtight manner by welding using electron beam welding or laser welding.

Then, the space surrounded by the diaphragm 8a, the cylindrical portion 8b, and the connecting cylindrical portion 8c of the sensor body 8 defines a pressure receiving chamber 7 into which a fluid such as gas flows.

In the present embodiment, the cylindrical sensor body 8 is made of spron 510 (Spron is a registered trademark), which is one of the cobalt-nickel alloy materials having excellent corrosion resistance, yield strength, and elasticity. The hardness Hv of the spron 510 is 500±30.

The pressure detecting element 2 is made of a metallic strain gauge having a strain gauge portion formed in a film shape by covering the resistance wire of the metal wire or metal foil with an insulator. The metal strain gauge may be a bridge circuit portion for detecting the resistance change and the strain gauge portion separated, or the strain gauge portion and the bridge circuit portion integrated.

The base ring 9, as shown in FIGS. 1 and 2, is configured to have a ring shape which has substantially the same length as the cylindrical portion 8b of the cylindrical sensor body 8 and closely fits to the outer peripheral surface of the cylindrical portion 8b, and made of a metal material having excellent corrosion resistance, and an annular stepped portion with a step-shaped cross-section is formed at one end portion of the base ring 9 (the end portion closer to the diaphragm 8a). The base ring 9 is fitted and fixed on the outer peripheral surface of the sensor body 8 in an airtight manner by fitting the base ring 9 to the outer peripheral surface of the cylindrical portion 8b of the cylindrical sensor body 8, and welding the outer peripheral edge of one end portion of the cylindrical portion 8b and the inner peripheral edge of one end portion of the base ring 9 (e.g., electron beam welding or laser welding).

In the present embodiment, the base ring 9 is made of a Hastelloy C-22 (Hastelloy is a registered trademark), which is one of the nickel-molybdenum-chromium alloys having excellent corrosion resistance and the like. Note that, since the deformation such as the diaphragm 8a is not required in the base ring 9, stainless steel (e.g., SUS316L, etc.) may be used instead of Hastelloy C-22 (Hastelloy is a registered trademark).

The hermetic ring 11, as shown in FIGS. 1 and 2, is made of a metal material having excellent corrosion resistance, and is configured to have a ring shape having an outer diameter as same as the outer diameter of the base ring 9, and an annular stepped portion with an step-shaped cross-sectional is formed at one end portion of the hermetic ring 11 (the end portion facing the base ring 9) to be fitted to the annular stepped portion formed at one end of the base ring 9. The annular stepped portion of the hermetic ring 11 is fitted to butt the annular stepped portion of the base ring 9, and the outer peripheral edges of the butting portion of the hermetic ring 11 and the base ring 9 are welded (e.g., electron beam welding or laser welding), so that the hermetic ring 11 is connected and fixed to one end surface of the base ring 9 in an airtight manner.

In addition, in the hermetic ring 11, distal end portions of a plurality of lead wires 10 are inserted through a low melting point glass material 15 in an airtight manner, and the distal end portions of the lead wires 10 are connected to a metal strain gauge that is the pressure detecting element 2.

In the present embodiment, the hermetic ring 11 is made of SUS316L, which is one of the austenitic stainless steels having excellent corrosion resistance and the like.

As shown in FIGS. 1 and 2, the closing disk 13 is made of a metal material having excellent corrosion resistance, and is configured to have a disk shape having an outer diameter as same as the outer diameter of the hermetic ring 11, and an annular notch portion for fitting the other end portion of the hermetic ring 11 is formed in the outer peripheral edge portion of the inner surface of the closing disk 13. The annular notch portion of the closing disk 13 is fitted to the other end of the hermetic ring 11 and the outer peripheral edge of the other end surface of the hermetic ring 11 and the outer peripheral edge of the inner surface of the closing disk 13 are welded (e.g., electron beam welding or laser welding), so that the closing disk 13 is connected and fixed to the end surface of the other end portion of the hermetic ring 11 in an airtight manner. As a result, a space is defined between the closing disk 13 and the diaphragm 8a, and this space defines the vacuum chamber 12.

In the present embodiment, the closing disk 13 is made of SUS316L, which is one of the austenitic stainless steels having excellent corrosion resistance and the like.

As shown in FIGS. 1 and 2, the cover body 14 is made of a synthetic resin material with an L-shaped annular cross section, a plurality of through holes 14a are provided therein for holding the plurality of lead wires 10 inserted through the hermetic ring 11 in a right angle state, and the cover body 14 are fitted to the outer peripheral edge portion of the closing disk 13 and the outer peripheral surface of the other end portion of the hermetic ring 11. Note that, the state of holding a plurality of lead wires 10 is not limited to a right-angle state but may be a shape to match the state to be held, and if it is not necessary to hold the lead wire 10, the cover body 14 may be omitted.

In the pressure sensor 1 configured as described above, the cylindrical member 5 is mounted and fixed in an airtight manner in communicating with the fluid passage 3 to the body 4 having the fluid passage 3 by the gasket 16, the washer 17, and the bonnet nut 18.

The body 4 is a body 4 having a fluid passage 3 of the pressure type flow rate control device or the concentration measurement device, or a body 4 having a fluid passage 3 interposed in a fluid supply line. The body 4 is made of a metal material having excellent corrosion resistance and yield strength (e.g., austenitic stainless steel), and is configured to have an appropriate shape. A fluid such as a gas (e.g., a process gas for a semiconductor manufacturing equipment) flows through the fluid passage 3 formed in the body 4.

In addition, as shown in FIG. 1, a circular insertion hole 19 for attaching the cylindrical member 5 of the pressure sensor 1 is formed in the body 4, and an internal thread 4a for removably screwing the bonnet nut 18 is formed in the inner peripheral surface of the insertion hole 19.

Furthermore, in the bottom central portion of the insertion hole 19 of the body 4, as shown in FIG. 1, a communication hole 20 for connecting the fluid passage 3 and the insertion hole 19 is formed in a communicating manner.

The gasket 16, as shown in FIG. 1, is made of austenitic stainless steel, and configured to have a ring shape with a size capable of insertion into the insertion hole 19 of the body 4, and a cross-sectional shape formed in a rectangular shape. One end surface of the gasket 16 is abutting the bottom surface of the insertion hole 19 of the body 4, and the other end surface of the gasket 16 is abutting the outer end surface of the mounting flange portion 5b formed in the cylindrical member 5. The cross-sectional shape of the gasket 16 is not limited to the rectangular shape, and it may be a circular or polygonal.

The washer 17, as shown in FIG. 1, is made of an annular plate-shaped member, so as to abut the inner side surface of the mounting flange portion 5b formed on the cylindrical member 5. Two sheets are used for this washer 17 and are made slidable on the contact surface when superimposed. Also, as the washer 17, a plate-shaped member made of synthetic resin or a metal plate made of stainless steel or the like is used. If the washer 17 are metal plates, it may be made to directly slide the metal surfaces to each other, it may be made for easy sliding by performing a coating or the like on the sliding surfaces.

The bonnet nut 18, as shown in FIG. 1, is made of austenitic stainless steel, and is configured to have a cylindrical shape with a size to be externally fitted to the cylindrical member 5, and an external thread 18a is formed on its outer peripheral surface for detachably screwing the internal thread 4a formed on the inner peripheral surface of the insertion hole 19 of the body 4.

Further, an annular fitting recess 18b for inserting the mounting flange portion 5b of the cylindrical member 5 and the washer 17 is formed in the inner peripheral edge portion of the lower end portion of the bonnet nut 18, and the shape of the outer peripheral surface of the upper-end portion of the bonnet nut 18 (the portion that does not form the external thread 18*a*) is formed in a polygon so that the bonnet nut 18 can be rotated by a tool such as a wrench.

In the present embodiment, the maximum outer diameter of the pressure sensor unit 6 (the outer diameter of the cover body 14) is 20 mm, the height of the pressure sensor unit 6 is 111.7 mm, the height of the pressure sensor unit 6 excluding the cover body 14 is 9.7 mm, the outer diameter of the cylindrical portion 8*b* of the sensor body 8 is 13 mm, the inner diameter of the sensor body 8 is 8 mm, the outer diameter of the welding flange portion 8*d* of the sensor body 8 is 10 mm, the outer diameter of the base ring 9, the hermetic ring 11 and the closing disk 13 is 15.7 mm, the outer diameter of the welding flange portion 5*a* of the cylindrical member 5 is 10 mm, the outer diameter of the mounting flange portion 5*b* of the cylindrical member 5 is 12.8 mm, the inner diameter of the cylindrical member 5 is 8 mm, and the height of the mounting flange portion 5*b* of the cylindrical member 5 is 1.5 mm, respectively. Further, the dimensions described here are only in one embodiment, and it is possible to vary the dimensions described above for each situation.

Next, a case where the pressure sensor 1 described above attached to the body 4 having the fluid passage 3 will be described.

First, insert the gasket 16 into the insertion hole 19 formed in the body 4, and place the gasket 16 on the bottom surface of the insertion hole 19 so that its center coincides with the communication hole 20.

Next, insert the combination of the cylindrical member 5, the two-sheets of washer 17, and the bonnet nut 18 into the insertion hole 19 of the body 4, screw the external thread 18*a* of the bonnet nut 18 into the internal thread 4*a* formed on the inner peripheral surface of the insertion hole 19, tighten the bonnet nut 18 to the side of the body 4, and then press the gasket 16, the mounting flange portion 5*b* of the cylindrical member 5, and the washer 17 to the bottom side of the insertion hole 19 by the bonnet nut 18.

In this way, the gasket 16 is pressed by the mounting flange portion 5*b* of the cylindrical member 5, seal portions are provided between one end surface of the gasket 16 and the bottom surface of the insertion hole 19 and between the other end surface of the gasket 16 and the outer surface of the mounting flange portion 5*b* respectively, and the cylindrical member 5 becomes attached to the insertion hole 19 in an airtight manner.

In the above embodiment, a combination of the cylindrical member 5, the two pieces of washer 17, and the bonnet nut 18 is inserted into the insertion hole 19 of the body 4, but in another embodiment, the cylindrical member 5, the two pieces of washer 17, and the bonnet nut 18 may be inserted in the insertion hole 19 of the body 4 in order.

Then, when attaching the cylindrical member 5 to the body 4 in an airtight manner, the welding flange portion 8*d* provided on the pressure sensor unit 6 is abutted to the welding flange portion 5*a* of the cylindrical member 5, and the welding flange portion 5*a* of the cylindrical member 5 and the welding flange portion 8*d* of the pressure sensor unit 6 are tightly connected and fixed by welding (e.g., electron beam welding or laser welding).

In this way, the pressure sensor 1 is attached to the body 4 having the fluid passage 3.

Since the sensor body 8 having the diaphragm 8*a* of the pressure sensor unit 6 is made of a cobalt-nickel alloy material having excellent corrosion resistance, yield strength and elasticity, strain or the like is hardly generated in the sensor body 8 even by long-term use, and the pressure sensor 1 is capable of measuring pressure with high accuracy.

In addition, in the pressure sensor 1, since the cylindrical member 5 attached to the body 4 having the fluid passage 3 is made of a lower nickel-molybdenum-chromium alloy material or stainless steel having excellent corrosion resistance, and lower hardness than that of the sensor body 8, even if the cylindrical member 5 is tightened and fixed to the body 4 side, loosening or the like hardly occurs, and the sealing property is not impaired.

Further, in the pressure sensor 1, since the gasket 16 inserted into the insertion hole 19 is sandwiched between the body 4 and the mounting flange portion 5*b* of the cylindrical member 5, and in this state, the mounting flange portion 5*b* of the cylindrical member 5 is pressed toward the body 4 side by the bonnet nut 18 screwed into the insertion hole 19 of the body 4, and the mounting flange portion 5*b* of the cylindrical member 5 is clamped and fixed by the body 4 and the bonnet nut 18, even if the mounting flange portion 5*b* of the cylindrical member 5 is clamped and fixed, the stress applied to the mounting flange portion 5*b* of the cylindrical member 5 is absorbed by the cylindrical member 5 and the connecting cylindrical portion 8*c*, and thus is not transmitted to the diaphragm 8*a*, so that the influence of the stress on the diaphragm 8*a* can be eliminated, and change in the output characteristics before and after the mounting of the pressure sensor 1 to the body 4 can be eliminated.

Figure 4:
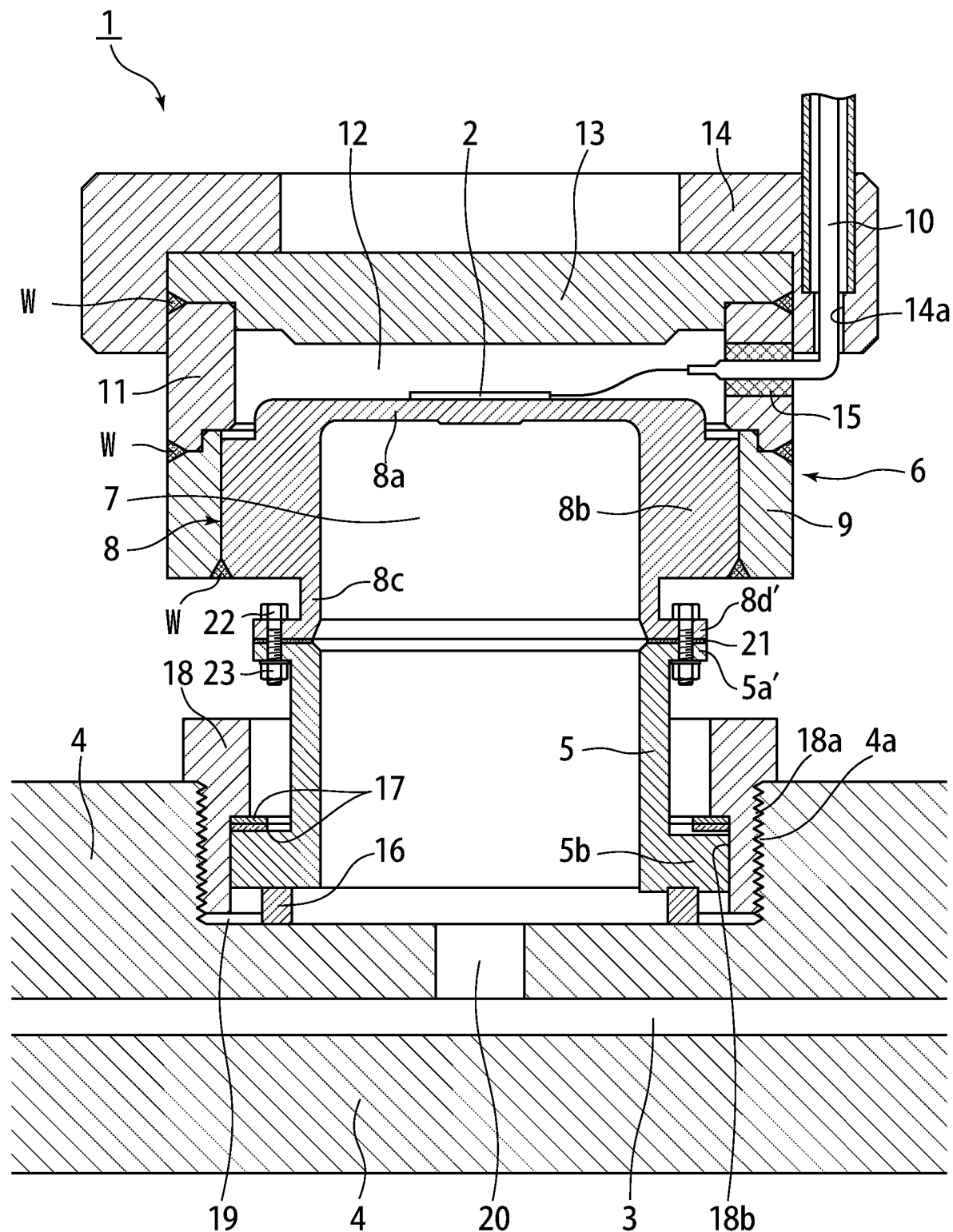
FIG. 4 is a longitudinal sectional view of a state where a pressure sensor according to another embodiment of the present invention is attached to the body having the fluid passage.
Figure 5:
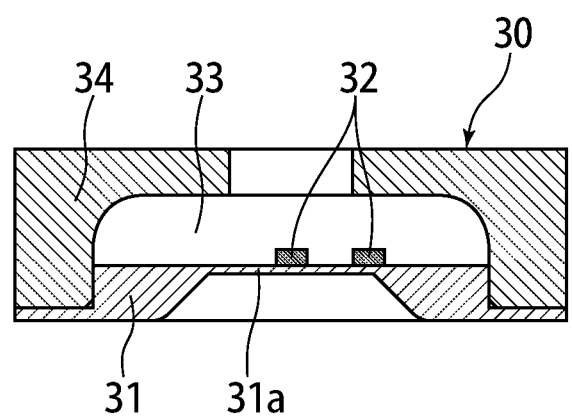
FIG. 5 is a longitudinal sectional view showing an example of a conventional pressure sensor.

FIG. 4 shows a pressure sensor 1 according to another embodiment of the present invention, the pressure sensor 1 employs a flange connection instead of the welding connection, and the cylindrical member 5 and the cylindrical sensor body 8 are connected in an airtight manner by the flange connection.

That is, in the pressure sensor 1, the cylindrical member 5 is configured to have a smaller diameter than the maximum outer diameter of the pressure sensor unit 6 (the outer diameter of the cover body 14), a connecting flange portion 5*a*' is provided at one end portion of the cylindrical member 5, and a mounting flange 5*b* is provided at the other end of the cylindrical member 5. Also, a connecting cylindrical portion 8*c* having a diameter smaller than the maximum outer diameter of the pressure sensor unit 6 and having an inner diameter as same as the inner diameter of the cylindrical member 5 is provided by protruding at the end surface of the opening side end portion of the cylindrical sensor body 8 of the pressure sensor unit 6, a connecting flange portion 8*d*' abutting the connecting flange portion 5*a*' of the cylindrical member 5 is provided at the end portion of the opening side of the connecting cylindrical portion 8*c*, an annular gasket 21 made of a metal plate is sandwiched between the connecting flange portion 5*a*' of the cylindrical member 5 and the connecting flange portion 8*d*' of the connecting cylindrical portion 8*c* formed on the cylindrical sensor body 8, and the connecting flange portion 5*a*' of the cylindrical member 5 and the connecting flange portion 8*d*' of the connecting cylindrical portion 8*c* are connected and fixed in an airtight manner by tightening bolts 22 and nuts 23. Here, although the connecting flange portion 5*a*' and 8*d*' are fixed to each other by the bolt 22 and nut 23, two connecting flange portions 5*a*' and 8*d*' may be clamped and fixed from outside by using a clamp (not shown). For example, a two-piece housing-shaped clamp may be used for clamping.

Note that, except that the connection structure between the cylindrical member 5 and the cylindrical sensor body 8 is configured as a flange structure instead of a welded structure, the pressure sensor 1 has the same structure as that of the pressure sensor 1 shown in FIG. 1, so the same members and parts as the pressure sensor 1 shown in FIG. 1 are denoted by the same reference numerals, and a detailed description thereof will be omitted.

The pressure sensor 1 also exhibits the same operation and effect as the pressure sensor 1 shown in FIG. 1.

In the above embodiment, a vacuum chamber 12 is provided in the pressure sensor unit 6, and a strain gauge is used as the pressure detecting element 2. However, in another embodiment, a pressure chamber filled with a pressure transmitting medium may be provided instead of the vacuum chamber 12 of the pressure sensor unit 6, and a pressure sensitive element (pressure detecting element 2) may be provided in the pressure chamber. As the pressure sensitive element, a diffusion type semiconductor pressure transducer having a pressure detecting diaphragm conventionally known is used.

In addition, in the above embodiment, the base ring 9, the hermetic ring 11, and the closing disk 13 are all provided separately, but in other embodiments, the base ring 9 and the hermetic ring 11, or the hermetic ring 11 and the closing disk 13, or the base ring 9, the hermetic ring 11, and the closing disk 13 may be integrated. Further, the materials of the base ring 9, the hermetic ring 11, and the closing disk 13 are not limited to those according to the above embodiment and may be any metal material having excellent corrosion resistance.

In addition, in the above embodiment, the cylindrical member 5 is made of the Hastelloy C-22 (Hastelloy is a registered trademark) or the SUS316L having excellent corrosion resistance and suitable for the seal structure, but the material of the cylindrical member 5 is not limited to that in the above embodiment, and any material may be used as long as it has excellent corrosion resistance and is suitable for the seal structure.

Further, in the above embodiment, the sensor body 8 having the diaphragm 8a is made of the spron 510 (Spron is a registered trademark) having excellent corrosion resistance, yield strength, and elasticity, but the material of the sensor body 8 is not limited to that of the above embodiment, and any material may be used as long as it has excellent corrosion resistance, yield strength, and elasticity.

Moreover, in the above embodiment, the diaphragm 8a is integrated with the cylindrical portion 8b of the sensor body 8, but in other embodiments, the cylindrical portion 8b of the sensor body 8 and the diaphragm 8a are formed separately, and the outer peripheral edge portion of the diaphragm 8a may be connected and fixed to the cylindrical portion 8b in an airtight manner by welding.

INDUSTRIAL APPLICABILITY

The pressure sensor 1 according to the present invention is mainly used in a gas supply line of semiconductor manufacturing equipment but is not limited to the semiconductor manufacturing equipment. It may also be used in a fluid supply line or the like in various equipment such as a chemical plant, chemical industry, and food industry.

DESCRIPTION OF NUMERALS

1 Pressure sensor
2 Pressure detecting element
3 Fluid passage
4 Body
5 Cylindrical member
5a Welding flange portion
5a' Connecting flange portion
5b Mounting flange portion
6 Pressure sensor unit
7 Pressure receiving chamber
8 Sensor body
8a Diaphragm
8b Cylindrical portion
8c Connecting cylindrical portion
8d Welding flange portion
8d' Connecting flange portion
16 Gasket
22 Bolt
23 Nut
W Welding

The invention claimed is:

1. A pressure sensor comprising:
a cylindrical member configured to be attached in an airtight manner to a body having a fluid passage in a state of communicating with the fluid passage, the cylindrical member being made of a nickel-molybdenum-chromium alloy material or a stainless steel material; and
a pressure sensor unit connected to the cylindrical member for detecting a pressure of a fluid flowing through the fluid passage of the body, the pressure sensor unit comprising:
a sensor body provided with a pressure receiving chamber into which the fluid flows and a diaphragm in contact with the fluid flowing into the pressure receiving chamber, the sensor body being closed at one end with the diaphragm, the sensor body being made of a cobalt-nickel alloy material, the sensor body being connected at an opening side end portion to one end portion of the cylindrical member in an airtight manner; and
a pressure detecting element for outputting displacement of the diaphragm as pressure,
wherein an outer diameter of the cylindrical member is smaller than a maximum outer diameter of the sensor body of the pressure sensor unit.

2. The pressure sensor according to claim 1, wherein the cylindrical member and the sensor body are connected in an airtight manner by welding.

3. The pressure sensor according to claim 2, wherein a welding flange portion is provided at one end of the cylindrical member, and a mounting flange portion is provided at the other end of the cylindrical member,
wherein the sensor body of the pressure sensor unit comprises:
a connecting cylindrical portion protruded at an end face of the opening side end portion of the sensor body, the connecting cylindrical portion having a smaller outer diameter than the maximum outer diameter of the sensor body of the pressure sensor unit and having an inner diameter as same as an inner diameter of the cylindrical member; and
a welding flange portion provided at the opening side end portion of the connecting cylindrical portion for abutting the welding flange portion of the cylindrical member, and
wherein the welding flange portion of the cylindrical member and the welding flange portion of the connecting cylindrical portion formed on the sensor body are connected and fixed in an airtight manner by welding.

4. The pressure sensor according to claim 1, wherein the cylindrical member and the sensor body are connected in an airtight manner by a flange connection.

5. The pressure sensor according to claim 4, wherein a connecting flange portion is provided at one end of the cylindrical member, and a mounting flange portion is provided at the other end of the cylindrical member, wherein the sensor body of the pressure sensor unit comprises:

a connecting cylindrical portion protruded at the end face of the opening side end portion of the sensor body, the connecting cylindrical portion having a smaller outer diameter than the maximum outer diameter of the sensor body of the pressure sensor unit and having an inner diameter as same as an inner diameter of the cylindrical member; and a connecting flange portion provided at the opening side end portion of the connecting cylindrical portion for abutting the connecting flange portion of the cylindrical member, and wherein a gasket is sandwiched between the connecting flange portion of the cylindrical member and the connecting flange portion of the connecting cylindrical portion formed on the sensor body, the connecting flange portion of the cylindrical member and the connecting flange portion of the connecting cylindrical portion being connected and fixed in an airtight manner by tightening bolts and nuts.

6. The pressure sensor according to claim 4, wherein a connecting flange portion is provided at one end of the cylindrical member, and a mounting flange portion is provided at the other end of the cylindrical member, wherein the sensor body of the pressure sensor unit comprises:

a connecting cylindrical portion protruded at the end face of the opening side end portion of the sensor body, the connecting cylindrical portion having a smaller outer diameter than the maximum outer diameter of the sensor body of the pressure sensor unit and having an inner diameter as same as an inner diameter of the cylindrical member; and a connecting flange portion provided at the opening side end portion of the connecting cylindrical portion for abutting the connecting flange portion of the cylindrical member, and wherein a gasket is sandwiched between the connecting flange portion of the cylindrical member and the connecting flange portion of the connecting cylindrical portion formed on the sensor body, the connecting flange portion of the cylindrical member and the connecting flange portion of the connecting cylindrical portion being connected and fixed in an airtight manner sandwiched from outside by a clamp.

7. The pressure sensor according to claim 1, wherein the cylindrical member has a connecting flange portion provided at one end of the cylindrical member, the sensor body of the pressure sensor unit has a connecting flange portion provided at an opening side end of a connecting cylindrical portion, and the connecting flange portion of the cylindrical member and the connecting flange portion of the sensor body of the pressure sensor unit are abutting and connected in an airtight manner from each other.

8. The pressure sensor according to claim 7, wherein the connecting cylindrical portion of the sensor body has a smaller outer diameter than the maximum outer diameter of the sensor body and has an inner diameter as same as an inner diameter of the cylindrical member.

* * * * *